United States Patent [19]
Hoover, Jr.

[11] 4,347,515
[45] Aug. 31, 1982

[54] RADAR RADIOMETER AND ITS USE

[75] Inventor: Mervyn C. Hoover, Jr., Ridgecrest, Calif.

[73] Assignee: The United States of America as represented by the Secretary of the Navy, Washington, D.C.

[21] Appl. No.: 196,225

[22] Filed: Oct. 14, 1980

[51] Int. Cl.³ .......................... H04B 7/00; G01S 7/40
[52] U.S. Cl. ............................ 343/100 ME; 343/17.7
[58] Field of Search .................. 343/100 ME, 17.7

[56] References Cited

U.S. PATENT DOCUMENTS

| | | | |
|---|---|---|---|
| 3,359,555 | 12/1967 | Taylor | 343/16 |
| 3,599,207 | 8/1971 | Foiani et al. | 343/5 R |
| 3,701,989 | 10/1972 | Calhoun et al. | 343/16 R |
| 3,766,556 | 10/1973 | Amoroso | 343/16 R |
| 3,778,824 | 12/1973 | Roger | 343/7 A |
| 3,787,857 | 1/1974 | Lazarchik et al. | 343/100 ME |
| 3,836,966 | 9/1974 | Frisbee | 343/14 |
| 4,015,261 | 3/1977 | Campbell | 343/18 E |
| 4,292,638 | 9/1981 | Lazarchik et al. | 343/100 ME X |

Primary Examiner—T. H. Tubbesing
Attorney, Agent, or Firm—Robert F. Beers; W. Thom Skeer

[57] ABSTRACT

A radar radiometer apparatus including a superheterodyne amplifier, a synchronous demodulator, and logic circuitry to provide for the interruption of a local oscillator for a portion of each pulse of a radio frequency repetition cycle in order to isolate radar receiver/transmitter coupling and permit simultaneous radiometer use.

18 Claims, 6 Drawing Figures

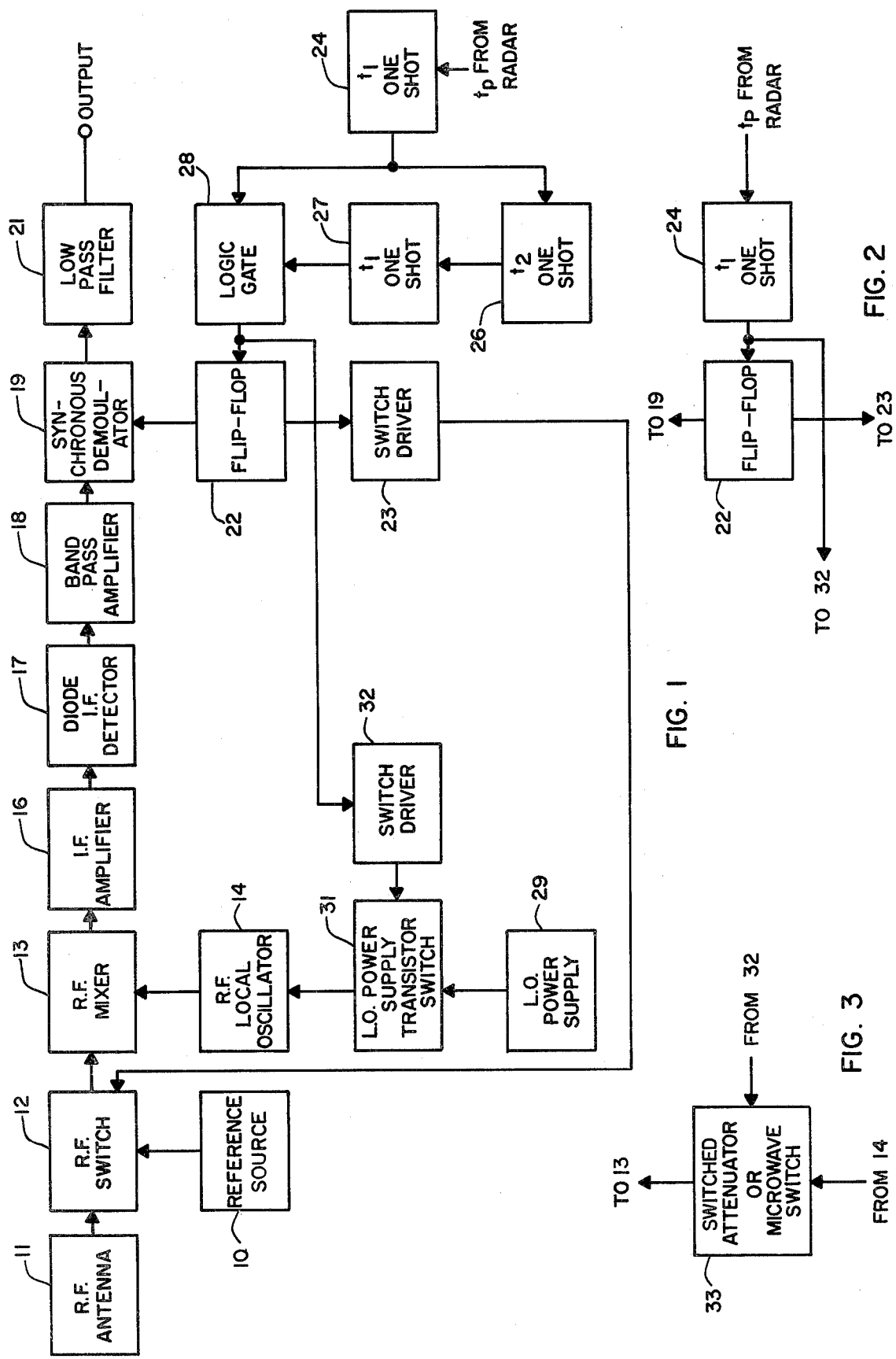

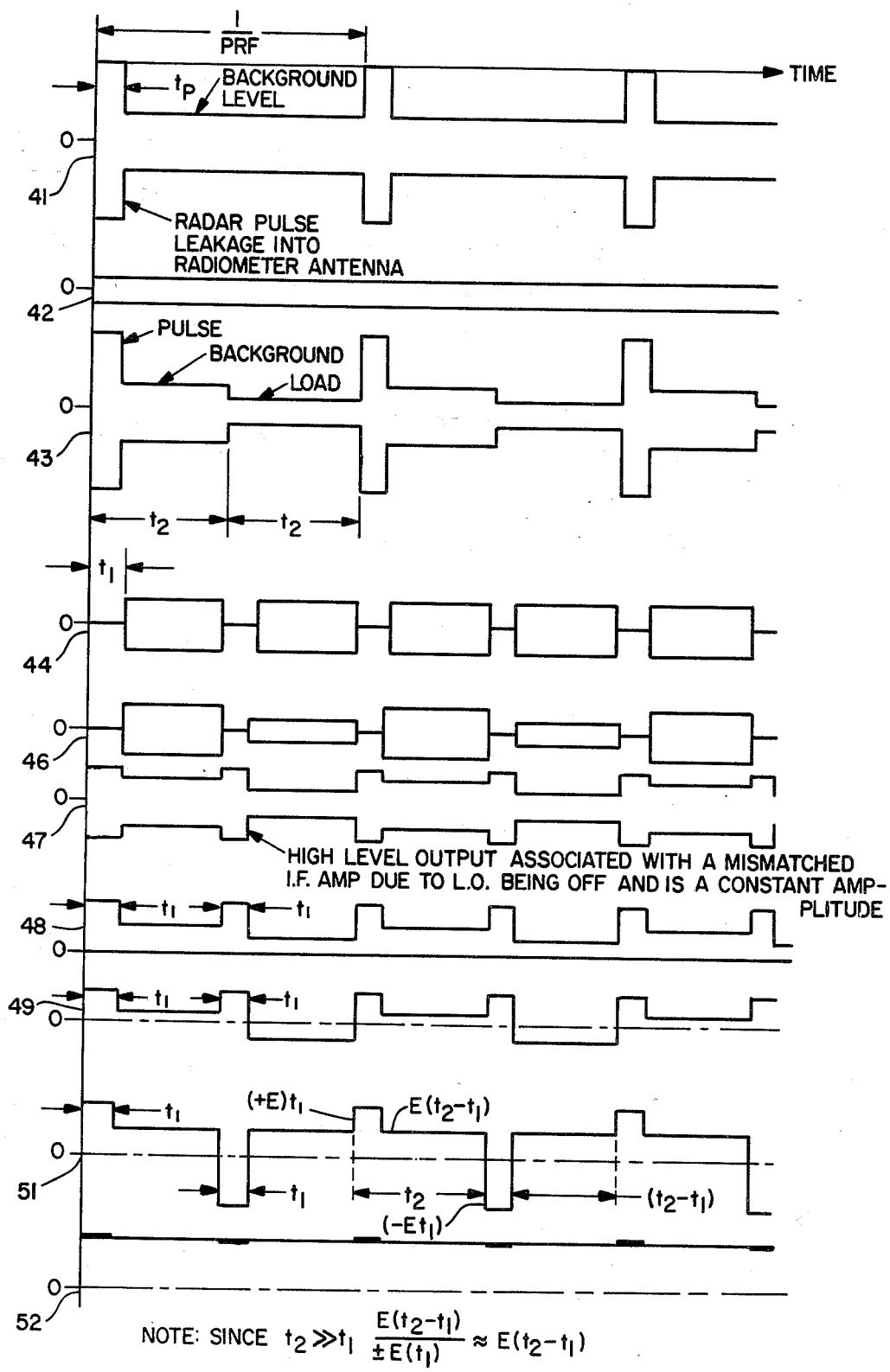

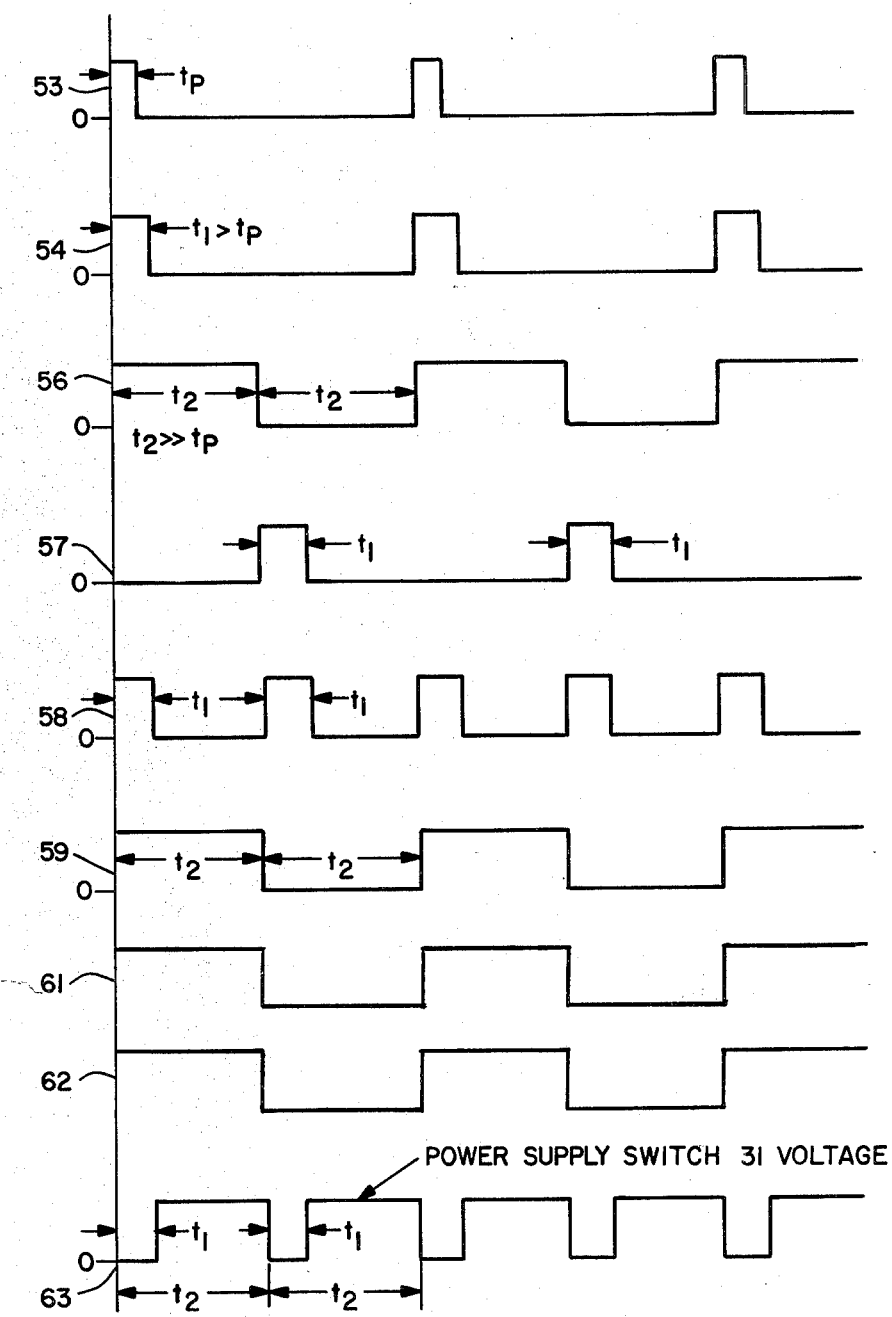

RADAR RADIOMETER AND ITS USE

BACKGROUND OF THE INVENTION

1. Field of the Invention

The present invention relates to an apparatus and a method for eliminating radio frequency interference caused by extraneous radar transmission while using a radiometer, and more particularly includes a superheterodyne amplifier and a synchronizing network for isolating radio frequency signals to be measured by the radiometer.

2. Description of the Prior Art

One method for isolating a radar transmitter from the receiving portion of a radar system having a radiometer is the use of a three-port circulator which isolates the transmitter from the receiver due to the directional properties of the circulator. This method adds loss to the radio frequency (RF) input circuit of the radiometer, reducing its effectiveness. Consequently, the isolation is low, generally less than 25 decibels, and the circulator adds volume and cost to the system.

Another method commonly used is a "TR" device, usually a gas discharge tube, or a solid state shorting device. This device is placed in the RF input line and adds losses, volume, and expense.

Still another method which is directed to a combined frequency modulated radar and radiometer system uses a reference system including a dual frequency modulated oscillator which functions as both a radar transmitter and as a radar radiometer local oscillator. Such a reference system includes a switch which alternately connects a receiver to a reference termination and to an antenna. The radiometer used in the reference system is generally of the "Dicke" type modified to include a radar capability. Such a system provides for the broad concept of both a radar and a radiometer capability in combination. However, the ability of the reference system to eliminate radio frequency interference is a disadvantage in some applications.

Another known method is directed to a radar system for detecting low-flying objects. The microwave energy being transmitted is sent simultaneously over a direct path and over a reflected path with the receiver having two radiometers to discriminate between incoming wave energy received over these paths. In this method switching means are used to alternate between cophasal and anti-phasal transmission as well as between additive and subtractive reception over these parts.

The prior art methods described are directed to switching means used in radar systems to optimize data input, and are not directed to the elimination of radio frequency interference.

SUMMARY OF THE INVENTION

A combined radar radiometer apparatus and method receives pulse repetition signals from another radar system operating at the same frequency as the radiometer. The apparatus includes a synchronous demodulator and an oscillator providing superheterodyne signals and a power supply for the oscillator. A switch is placed between the power supply and the oscillator and coupled to the synchronous demodulator for interrupting the operation of the oscillator for a portion of each pulse repetition frequency ($f_{prf}$) cycle in order to isolate the transmitter-receiver coupling and permit simultaneous radiometer use.

OBJECTS OF THE INVENTION

An object of the present invention is to provide a higher isolation for the RF pulse energy received from extraneous transmissions.

Another object is to eliminate degradation of the radiometric performance due to increased losses between the antenna and the RF amplifier.

Still another object is to provide an automatic blanking of early or nearby returns from the transmitted pulse.

These and other objects will become apparent from the following description of the preferred embodiments, claims, and attached drawings.

BRIEF DESCRIPTION OF THE DRAWINGS

FIG. 1 is a block diagram of an embodiment of the present invention;

FIG. 2 is a block diagram of an alternate circuit of a portion of FIG. 1;

FIG. 3 is a block diagram of another alternate circuit of a portion of FIG. 1;

FIGS. 4(a) and 4(b) are a waveform diagram of FIG. 1; and

DESCRIPTION OF THE PREFERRED EMBODIMENT

Figure 5:
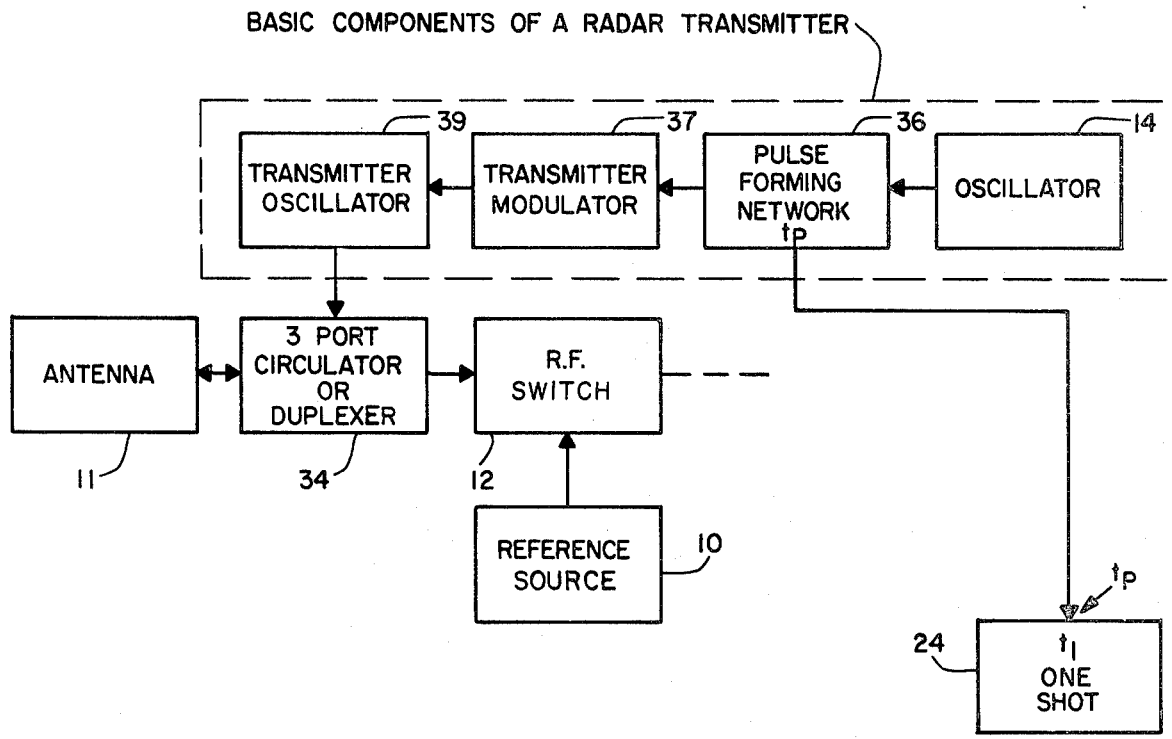
FIG. 5 is an alternate embodiment of a portion of FIG. 1.

FIG. 1 shows a radar system having a standard type of "Dicke" radiometer. This radiometer includes antenna 11, radio frequency (RF) switch 12, mixer 13, local oscillator 14, intermediate frequency (IF) amplifier 16, IF detector 17, band pass amplifier 18, synchronous demodulator 19, low pass filter 21, flip-flop square wave generator 22, switch driver 23, and local oscillator power supply 29.

Mixer 13, local oscillator 14, IF amplifier 16, IF detector 17, and local oscillator power supply 29 comprise a conventional superheterodyne RF amplifier.

FIG. 1 includes the plurality of one-shot multi-vibrators 24, 26, and 27 operated at pulse widths $t_1$, $t_2$, and $t_1$ respectively, logic gate 28, switch driver 32, and local oscillator power supply transistor switch 31, which in combination with the conventional superheterodyne RF amplifier comprise the system of the invention.

More particularly, radio frequency energy received by antenna 11 is fed to RF switch 12 which has three input ports from antenna 11, reference source 10, and switch driver 23. This RF energy may include radar pulses as indicated in FIG. 4(a) at 41.

RF mixer 13 alternately receives two inputs, from RF switch 12, FIG. 4(a), waveform 42, and another input from local oscillator 14 shown in FIG. 4(a) at 44. Local oscillator 14 provides signals which combine with the incoming RF signals in the mixer 13 converting the incoming RF shown at 46, FIG. 4(a), to an IF signal which is then amplified by IF amplifier 16, FIG. 4(a), waveform 47. IF detector 17 rectifies the IF signal and provides filtering as shown at 48, FIG. 4(a). This detected and filtered IF signal is applied to bandpass amplifier 18. The amplified bandpass signal, waveform 49, is applied to synchronous demodulator 19 which changes the polarity of the applied voltage at predetermined intervals in synchronism with RF switch 12. The output of synchronous demodulator 19, waveform 51, FIG. 4(a), is filtered by low pass filter 21 to produce a smoothed output shown at 52, FIG. 4(a). Bandpass amplifier 18, synchronous demodulator 19, and low pass filter 21 comprise synchronous detector for the circuitry of the invention.

RF switch 12 and synchronous demodulator 19 are commonly driven by a frequency generated by a flip-flop square wave generator 22. Switch driver 23 provides switching voltages in response to the signals from flip-flop 22. Switch driver 23 is of conventional construction and provides the necessary power and circuit impedance matching required for the specific application. Additionally, the circuit causes alternate switching between the RF antenna 11 and the reference source 10 connected to the input ports of RF switch 12.

The interferring radar signal as shown at 53, FIG. 4(b), may include a pulse of width $t_p$ seconds, repeated at a frequency of $f_{prf}$ hertz. This pulsed signal is applied to an input circuit which includes a one-shot multivibrator 24 which produces an output shown at 54, FIG. 4(b), which includes a pulse of width $t_1$ seconds. This multivibrator pulse is simultaneously applied to a second one-shot multivibrator 26 which produces a positive output signal, shown at 56, FIG. 4(b), with a pulse of width $t_2$ seconds which is adjusted to be exactly equal to $1/(2 \times f_{prf})$ seconds. The trailing edge of this positive voltage pulse generated by second one-shot multivibrator 26 is applied to a third one-shot multivibrator 27 which generates an output signal shown at 57, FIG. 4(b), as having a pulse of width $t_1$ seconds.

Both one-shot multivibrators 24 and 27 generate pulse of $t_1$ seconds which are applied to a logic gate 28, which may be an OR gate. The output of the logic gate 28 is shown at 58 and includes two pulses of width $t_1$ separated in time by $1/(2 \times f_{prf})$ second coupled to flip-flop 22. The leading edge of each pulse triggers flip-flop 22 to produce an output shown at 59, FIG. 4(b).

The local oscillator power supply 29, deriving power from an external source, not shown, applies operating voltage to local oscillator 14 via a transistor switch 31 which is normally closed. The power supply voltage transferred by switch 31 energizes the local oscillator 14 causing it to oscillate at a predetermined frequency to supply mixer 13 with an RF signal for mixing. The output from logic gate 28 is applied to a switch driver 32 which is connected to local oscillator switch 31. The output is indicated at 62 in FIG. 4(b). During the duration of the pulses ($t_1$ seconds) switch 31 shuts off power to local oscillator 14, as shown by waveform 63, causing mixer 13 to cease functioning as a frequency converter.

The removal of local oscillator power by switch 31 prevents RF energy entering the mixer 13 from being converted to IF which can be amplified by IF amplifier 16. This off condition also produces an output from If amplifier 16 which is always the same magnitude. The condition also offers complete isolation of the incoming RF energy to the remaining parts of the system.

A radar pulse of high RF is transmitted during the period $t_p$ seconds at intervals of $1/f_{prf}$ seconds. This high RF from the radar is coupled into antenna 11 and will saturate the Dicke radiometer rendering it useless for the recovery period of the system which may approach the period $1/f_{prf}$ seconds, unless the new features are employed.

Pulses supplied by logic gate 28 and driver 23 shut off RF switch 12 which shifts the signal to reference source 10 as is conventional in Dicke radiometer operation.

Reference source 10 produces a fixed, constant RF power which will be compared at the output of the synchronous demodulator 19 to the RF power collected by antenna 11.

By carefully following the waveforms of FIG. 4(a), from 43 to 51, the Dicke radiometer function can be observed. The waveforms shown represent the condition where the level of RF power at antenna 11 is larger than the RF power at reference source 10. The condition produces a positive voltage from low pass filter 21 as shown at waveform 52, FIG. 4(a).

The condition where the RF power from antenna 11 is less than the RF power from reference source 10 would produce a waveform similar to waveform 43, FIG. 4(a), except the relative voltage magnitudes of antenna 11 and reference source 10 signals are reversed. The resulting waveform 52, FIG. 4(a), would be negative rather than positive.

When local oscillator 14 ceases oscillation due to the presence of the interferring radar signal, mixer 13 no longer converts the incoming RF energy to IF energy. Mixer 13 therefore acts as an extremely large attenuator (hundreds of decibels). The condition exists during the period $t_1$ seconds which is equal to or greater than the period $t_p$ seconds but a small portion of $1/f_{prf}$. The condition produces an effectively large signal from radiometer components 16, 17, and 18 but since the condition exists on each half of the demodulator period, (one of which is inverted in voltage sense by synchronous demodulator 19) the average voltage produced by this condition is zero at the output of the synchronous demodulator 19.

the bandwidth of low pass filter 21 is low enough that the frequencies of pulse $t_1$ are not observed. The radiometric functions therefore, remain unaffected. Energy from the radar transmitter pulse is not observed, nor is the reflected energy from the pulse during the period $(t_1 - t_p)$ seconds.

FIG. 2 embodies a flip-flop square wave generator 22 connected directly to first one-shot multivibrator 24. This system may be used with high pulse repetition frequencies (PRFs) and eliminates the need for logic gate 28 and the second and third multivibrators 26 and 27 thereby reducing the circuitry complexity somewhat.

FIG. 3 is an alternative embodiment of the present invention and a block diagram of a switch attenuator or microwave switch 33 which may be used in series with local oscillator 14 in place of power supply switch 31.

The waveforms associated with FIG. 1 are shown in FIGS. 4(a) and 4(b) and have been described in conjunction with FIG. 1.

FIG. 5 shows an alternate embodiment of a portion of FIG. 1 and comprises both receiving and transmitting radar circuitry to permit the unit to be used in conjunction with a conventional pulse radar. The block diagram includes first one-shot multivibrator 24, oscillator 14, pulse forming network 36, transmitter modulator 37, transmitter oscillator 39, three port circulator or duplexer 34, antenna 11, reference source 10, and RF switch 12. One-shot 24 is shown connected to the pulse forming network 36 of the radar transmitter to receive the timing signals therefrom. The three port circulator 34 is connected in series with the radiometer signal flow between antenna 11 and RF switch 12. The remaining portions are, of course, like those shown in FIG. 1. Thus the system of the invention may be connected to a conventional radar.

I claim:

1. A radar-radiometer comprising:
an antenna;
a reference signal source;
an antenna switch having a first input connected to said antenna and another input connected to said reference signal source and an output;
a mixer circuit connected to said output of said antenna switch;
a local oscillator connected to said mixer;
a power supply;
a power switch connected to said local oscillator and to said power supply for selective interruption of the flow of electrical power therebetween; and
logic circuit means for actuating said antenna switch and said power switch and operatively connected thereto, whereby the signals from said antenna and said local oscillator are interrupted to effect a high degree of signal attenuation for high power level RF sources.

2. A radar radiometer according to claim 1 further including a synchronous detector connected to said logic circuit means and operatively associated with said mixer for detection of signals passed thereby.

3. A radar radiometer according to claim 2 in which said synchronous detector is connected to said mixer by an envelope detector and a bandpass filtered IF amplifier.

4. A radar radiometer according to claim 2 in which said logic circuit means includes a flip-flop circuit connected to said synchronous detector and to said antenna switch.

5. A radar radiometer according to claim 4 in which said connection of said logic circuit to said antenna switch includes a switch driver circuit.

6. A radar radiometer according to claim 2 in which said logic circuit means includes:
a flip-flop circuit having an output connected to said synchronous detector and having an input; and
an input circuit having an input connected to a source of synchronizing signals and an output connected to said input of said flip-flop circuit.

7. A radar radiometer according to claim 6 in which said input circuit includes a first one-shot multivibrator.

8. A radiometer according to claim 7 in which said input circuit further includes a logic gate connected between said first one-shot multivibrator and said flip-flop.

9. A radar radiometer according to claim 8 wherein said input circuit further includes:
a second one-shot multivibrator connected to said first one-shot multivibrator; and
a third one-shot multivibrator connected between said second one-shot multivibrator and said logic gate.

10. A radar-radiometer comprising:
an antenna;
a reference signal source;
an antenna switch having a first input connected to said antenna and another input connected to said reference signal source and an output;
a mixer circuit connected to said output of said antenna switch;
a local oscillator;
a local oscillator switch connected between said local oscillator and said mixer circuit for selective connection of said local oscillator to said mixer; and
logic circuit means for actuating said antenna switch and said local oscillator switch and operatively connected thereto, whereby the signals from said antenna and said local oscillator are interrupted to effect a high degree of signal attenuation from high power level RF sources.

11. A radar radiometer according to claim 10 further including a synchronous detector connected to said logic circuit means and operatively associated with said mixer for detection of signals passed thereby.

12. A radar radiometer according to claim 11 in which said synchronous detector is connected to said mixer by an envelope detector and a bandpass filtered IF amplifier.

13. A radar radiometer according to claim 11 in which said logic circuit means includes a flip-flop circuit connected to said synchronous detector and to said antenna switch.

14. A radar radiometer according to claim 13 in which said connection of said logic circuit to said antenna switch includes a switch driver circuit.

15. A radar radiometer according to claim 11 in which said logic circuit means includes:
a flip-flop circuit having an output connected to said synchronous detector and having an input; and
an input circuit having an input connected to a source of synchronizing signals and an output connected to said input of said flip-flop circuit.

16. A radar radiometer according to claim 15 in which said input circuit includes a first one-shot multivibrator.

17. A radiometer according to claim 16 in which said input circuit further includes a logic gate connected between said first one-shot multivibrator and said flip-flop.

18. A radar radiometer according to claim 17 wherein said input circuit further includes:
a second one-shot multivibrator connected to said first one-shot multivibrator; and
a third one-shot multivibrator connected between said second one-shot multivibrator and said logic gate.

* * * * *